Dec. 16, 1924.　　　　　　　　　　　　　　　　1,519,440
R. COLOMBINO
COLLAPSIBLE HOOD FOR MOTOR VEHICLES
Filed Aug. 7, 1922　　　2 Sheets-Sheet 1
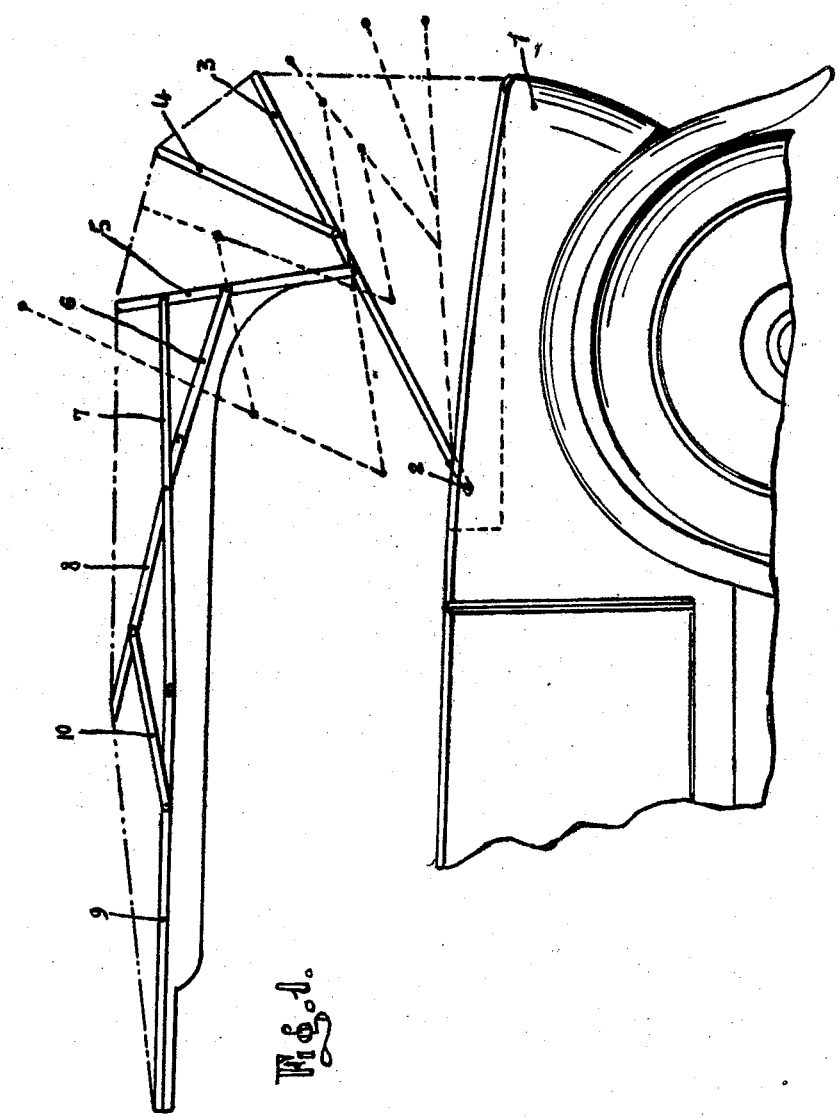
Inventor
Rino Colombino
atty

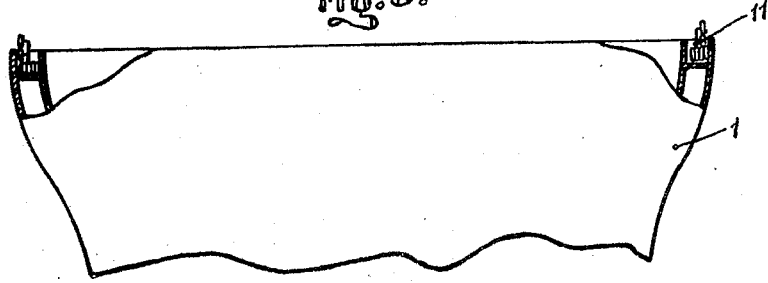
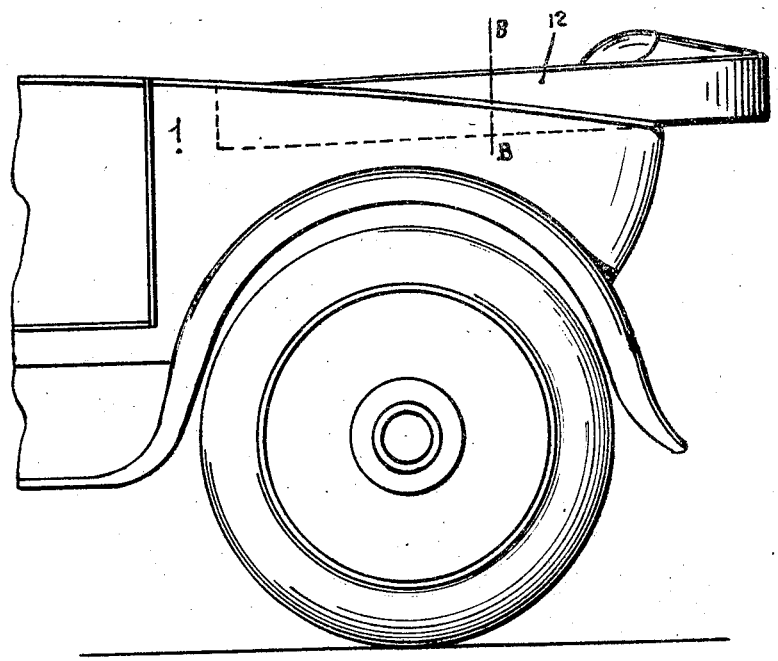

Patented Dec. 16, 1924.

1,519,440

UNITED STATES PATENT OFFICE.

RINO COLOMBINO, OF TURIN, ITALY.

COLLAPSIBLE HOOD FOR MOTOR VEHICLES.

Application filed August 7, 1922.  Serial No. 580,179.

*To all whom it may concern:*

Be it known that I, RINO COLOMBINO, a subject of the King of Italy, resident of 26 Via Pastrengo, Turin, in the Kingdom of Italy, have invented certain new and useful Improvements in Collapsible Hoods for Motor Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The ordinary foldable or collapsible hood for motor vehicles is capable of easy and rapid manipulation but spoils the simple and continuous lines of the vehicle body. It has been proposed to provide a hood which can be gathered, in the folded condition, completely into a space provided in the vehicle body, thus leaving the profile of the body entirely free and unobstructed.

The æsthetic result of this solution is very satisfying but, in practice, the functioning of the hood presents serious inconveniences, such as the difficulty of gathering the hood, particularly when wet, into the space provided in the body for its accommodation, which space, of necessity, is of restricted dimensions.

The present invention combines the advantages of the two arrangements of collapsible hoods indicated above and at the same time eliminates the inconveniences peculiar to each. This result is obtained by forming in the side walls of the vehicle body recesses in which the hood supporting frame-work rests when the hood is collapsed, whilst the bulk of the cover is drawn back and lies behind the rear wall of the vehicle as at present.

The line of the vehicle is thus completely visible when the hood is collapsed; the cover being gathered together mainly behind the vehicle.

The hood comprising the cover and supporting frame work is such that whilst the latter is of a strength equal to, if not greater than, that in known types of hood, it allows unobstructed side views to persons seated in the rear seats when the hood is elevated.

One form of hood in accordance with the invention is illustrated by way of example on the accompanying drawings whereon:—

Fig. 1 is a partial elevation of a motor vehicle with the hood raised.

Fig. 2 is a similar view with the hood collapsed.

Fig. 3 is a section on the line A—B of Fig. 2.

Referring to the drawings:

1 indicates the body of the vehicle to which is pivoted, at 2, in recesses 11 formed in the side walls of the vehicle (see Fig. 3) the principal hoop 3 of the head frame. On the principal hoop are pivoted a secondary hoop 4, whose arch is greater than that of the hoop 3 in order that it may be lowered over and encircle the latter without increasing the thickness vertically, and a tertiary hoop 5 to which are pivoted cross links 6, 7, carrying hoops 8, 9, connected by connecting links 10.

The hood, when extended, is very elegant, the links and the hoops which might spoil the line of the vehicle and interfere with the side view of persons seated in the same not being visible. When the hood is collapsed the frame-work rests mainly in the recesses 11, in the side walls of the vehicle body and the outline of the latter remains visible.

A leather or like bag 12 may be drawn over the collapsed hood.

It will be seen that the bottom of each recess 11 is approximately on a level with the top of the rear wall of the vehicle body.

Having now particularly described and ascertained the nature of my said invention and in what manner the same is to be performed, I declare that what I claim is:

1. In combination, a vehicle body having recesses in the thickness of its side walls, the bottom of said recesses being substantially at the same level as the top of the rear wall of said body, and a collapsible hood mounted in said recesses and whose side members lie therein when folded and whose bows rest on said rear wall, whereby the stream line of the body is maintained when the hood is folded.

2. A vehicle body having longitudinal recesses in the thickness of its side walls, each recess having its maximum depth at its front end and its bottom extending in a substantially horizontal plane and terminating at the rear end in the plane of the top of the rear wall of the vehicle body, and a collapsible hood mounted in the recesses so that the side members lie therein when folded and the top portions project behind the rear wall of the car body.

In testimony that I claim the foregoing as my invention, I have signed my name.

RINO COLOMBINO.